United States Patent [19]

Aubrey

[11] Patent Number: 5,073,845
[45] Date of Patent: Dec. 17, 1991

[54] FLUORESCENT RETROFIT LIGHT FIXTURE

[75] Inventor: Truman R. Aubrey, Glendale, Calif.
[73] Assignee: Janice Industries, Inc., Azusa, Calif.
[21] Appl. No.: 335,553
[22] Filed: Apr. 10, 1989
[51] Int. Cl.⁵ ............................................. H01R 33/00
[52] U.S. Cl. .................... 362/226; 362/260; 362/263; 362/362; 439/226; 439/518
[58] Field of Search ............... 362/260, 261, 263, 264, 362/362, 457, 458, 226, 257, 368, 364, 404, 408, 145, 148, 296, 310; 439/226, 231, 188, 518, 236; 313/318; 315/224, 244, 87

[56] References Cited

U.S. PATENT DOCUMENTS

| | | | |
|---|---|---|---|
| 2,678,380 | 5/1954 | Westby | 362/221 |
| 3,815,080 | 6/1974 | Summa | 362/457 |
| 4,327,403 | 4/1982 | Capostagno et al. | 362/368 |
| 4,374,407 | 2/1983 | Drost et al. | 362/368 |
| 4,403,277 | 9/1983 | Eargle, Jr. et al. | 362/263 |
| 4,507,719 | 3/1985 | Quiogue | 362/218 |
| 4,520,436 | 5/1985 | McNair et al. | 362/220 |
| 4,591,957 | 5/1986 | Harwood | 362/225 |
| 4,688,154 | 8/1987 | Nilssen | 362/404 |
| 4,723,200 | 2/1988 | Troen | 362/260 |
| 4,750,096 | 6/1988 | Lim | 362/260 |
| 4,791,539 | 12/1988 | Ewing | 362/226 |
| 4,816,974 | 3/1989 | Gordin | 362/303 |
| 4,855,883 | 8/1989 | Spitz | 362/217 |
| 4,878,159 | 10/1989 | Blaisdell et al. | 362/260 |

FOREIGN PATENT DOCUMENTS

| | | | |
|---|---|---|---|
| 0241111 | 11/1986 | Fed. Rep. of Germany | 362/260 |
| 2203527 | 10/1988 | United Kingdom | 362/263 |

*Primary Examiner*—Ira S. Lazarus
*Assistant Examiner*—D. M. Cox
*Attorney, Agent, or Firm*—G. Donald Weber, Jr.

[57] ABSTRACT

A retrofit unit for replacing conventional incandescent light bulbs with fluorescent, high pressure sodium, metal halide or similar light bulbs, tubes or sources. A hardwire ballast is used in conjunction with conventional light fixtures, including recessed fixtures, to permit the retrofit conversion from incandescent light sources.

18 Claims, 1 Drawing Sheet

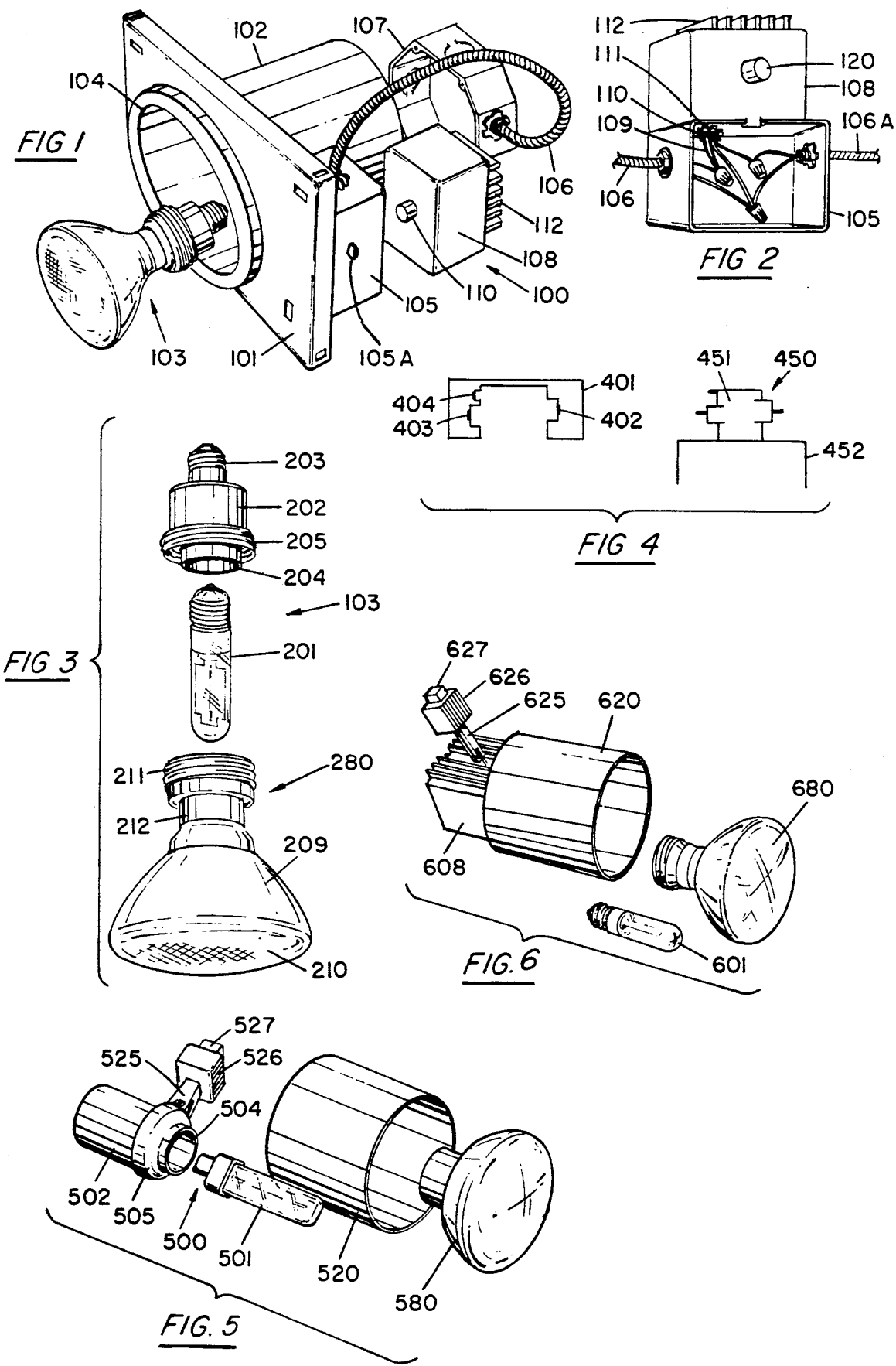

FLUORESCENT RETROFIT LIGHT FIXTURE

BACKGROUND

1. Field of the Invention

This invention is directed to light fixtures, in general, and, more particularly, to a light fixture wherein a conventional incandescent light source is readily converted to a fluorescent, metal halide, high pressure sodium or similar light source which uses a ballast.

2. Prior Art

There are many types of light fixtures which are known in the art. These include recessed fixtures, surface mounted fixtures, track-light fixtures and the like. Most of the known light fixtures use incandescent light sources therein. However, incandescent light sources have a short life and are inefficient. The number of lumens generated per electrical watt consumed is not economical and is generally in the area of 14 to 17 lumens per watt.

In addition, these types of light sources generally use a thin filament which glows when heated by electrical power, and tends to burn out or break rather easily.

Also, incandescent light sources tend to generate a large amount of heat which is given off into the surrounding area. This has the secondary shortcoming of producing heat in many places where excessive heat is not desired. Consequently, it becomes necessary to use air conditioning equipment or the like to eliminate this unwanted heat. Consequently, incandescent light sources tend to be energy consumers and wasters.

Several types of alternative light sources are known in the art. For example, fluorescent, high pressure sodium and metal halide lamps and the like are typical. These light sources generally tend to operate quite efficiently and provide 50 to 120 lumens per watt. The lower wattages do not, as a rule, produce excess heat during operation.

However, these alternative light sources are normally not interchangeable with incandescent lamps or bulbs. For one thing, the different light sources may have different couplings, as is the case with fluorescent. The "Edison-base" coupling which is common on the ordinary incandescent lamp and light fixture will not accept standard fluorescent fittings. Although single ended high pressure sodium and metal halide lamps are available and can be screwed into an Edison-base socket, they cannot be successfully operated because all the arc discharge lamps covered under this invention require a ballast to operate the lamp. Since the ballast may be relatively large, it usually cannot be mounted within the interior of the fixture.

In essence, the ballast must be used to deliver the proper current to the particular light source. The wattage of lamp, lamp type and line voltage will dictate the specific ballast design to match the lamp.

Normally, line voltage is 120 volts or 240 volts. However, other voltages may be encountered. Therefore, a specific ballast must be used to drive a specific lamp.

In order to convert an existing inefficient incandescent lighting system to a more efficient light source, it has been necessary to replace the existing lighting fixture with a totally new lighting fixture that incorporates the proper socket configuration and ballast assembly in a new fixture.

Certain retrofit light fixtures were developed which included ballasts built right into the fixture itself or an attached housing. These light fixtures, however, required an ample and substantial amount of space within the existing fixture to house the ballast and socket assemblies.

Consequently, it is highly desirable to develop ligh fixtures which permit these alternative light sources to be retrofitted into existing electrical system hardware efficiently and economically.

PRIOR ART STATEMENT

The most pertinent prior art known to applicant is listed herewith in patent number order. No special significance is given to any particular patent or to any prior art not known to applicant.

U.S. Pat. No. 4,327,402; LIGHT FIXTURE; T. Aubrey. This patent is directed to an adjustable, retro-fit fluorescent light fixture with a telescoping adjustment mechanism.

U.S. Pat. No. 3,660,651; ADJUSTABLE LIGHT FIXTURE; E. Miles, Jr. This patent is directed to an adjustable light fixture using a pair of levered arms to adjust the position of the lamp.

U.S. Pat. No. 4,232,361; ADJUSTABLE LIGHT FIXTURE; J. Kelsall. This patent is directed to an adjustable light fixture with a plurality of resilient tracks for adjusting the position of the light fixture.

U.S. Pat. No. 4,520,436; LAMP APPARATUS; R. McNair et al. This patent is directed to a lamp apparatus which includes a reflector and an integral trim ring.

U.S. Pat. No. 4,595,969; LAMP MOUNTING APPARATUS AND METHOD; R. McNair. This patent is directed to a retro-fit lamp fixture using a plastic strap with a "gripper" which is connected to and slidable along the strap.

U.S. Pat. No. 4,704,664; LAMP APPARATUS; R. McNair. This patent is directed to substantially the same device as the 4,520,436 patent with the addition of a cover to enclose the ballast and sockets.

U.S. Pat. application Ser. No. 06/679,281; LAMP APPARATUS; R. McNair. This application is a continuation-in-part application of U.S. Pat. No. 4,704,664 noted-above.

Swiss Patent No. 7241; SUSPENSION DEVICE FOR INCANDESCENT LAMPS; H. Rentzch. This patent is directed to a device for counterbalancing a lamp suspended by a light cord.

Copending application Ser. No. 07/335,554 of T. Aubrey et al entitled LAMP MOUNTING APPARATUS AND METHOD filed on even date herewith.

SUMMARY OF THE INVENTION

This invention is related to a retrofit lighting fixture wherein incandescent or other types of inefficient light sources are replaced by fluorescent, high pressure sodium or metal halide light sources. One of the important aspects of this type of device is the use of a "hardwire" ballast. That is, the ballast can be mounted directly onto the splice box of the existing light fixture. Another aspect of the invention is that is allows the use of Arc Discharge Lamps that require a ballast with the ballast hardwire directly into the splice compartment. Also, the high fluorescent, pressure sodium light sources can be used with threaded reflectors, separate mounting bases and the like, in order to enhance the retrofit efficiency and desirability.

BRIEF DESCRIPTION OF THE DRAWINGS

FIG. 1 is a partially exploded, isometric view of a representative light fixture together with a retrofit ballast and light source.

FIG. 2 is a detailed showing of a representative arrangement of the ballast with a conventional junction box of a conventional light fixture.

FIG. 3 is an exploded view of a high pressure sodium light source.

FIG. 4 is a schematic view of the track and coupling for "track-mounted" light fixtures.

FIG. 5 is an exploded view of a track mounted light source using a fluorescent lamp.

FIG. 6 is an exploded view of a track mounted light source using a high pressure gas-filled lamp.

DESCRIPTION OF THE PREFERRED EMBODIMENTS

Referring now to FIG. 1, there is shown a view of a conventional light fixture 100. This type of fixture is typical of fixtures which are used as recessed fixtures, most often in ceiling mountings. The face plate 101 is adapted to be mounted to a support structure (e.g. a ceiling, the T-bars in a dropped ceiling or the like). This mounting procedure is conventional.

A "can" 102 is mounted on the inner surface of plate 101. It may also act as a reflector in some instances. The can 102 is usually connected to the face plate 101 with screws. If the can 102 also acts as a reflector, it is usually held in place with spring or barbed clips. The can 102 is usually removable by removing screws or by pulling down on the can thereby releasing the can 102, (reflector) from the face plate 101. A flexible conduit wireway 106 is usually connected to the upper end of the can 102 in the Edison socket area. A separate cup to which the Edison socket is attached may also be used with the fixture 100.

This socket cup is usually held in place with spring clips or other suitable attachments. The can 102 is shown to have a cylindrical configuration but other shapes are contemplated. The can 102 is arranged to be deep enough to receive the lamp 103 which is, in this embodiment, a retrofit lamp which is not an incandescent lamp. The lamp 103 can have several alternative configurations with different lengths. In some instances, the can 102 can serve as a reflector for the light fixture. In other instances, the reflector can be a separate unit which is mounted to the face plate 101 and/or to the can 102.

An outer edge or trim ring 104 is shown. This trim ring may be a part of the separate reflector, per se, or a part of the can 102. In fact, the trim ring 104 can be inserted into the can after the light fixture 100 is mounted into the ceiling. Thus, the trim ring 104 can be mounted flush with the ceiling as described in the co-pending application of T. Aubrey et al; entitled LAMP MOUNTING APPARATUS AND METHOD (JI-1); filed on Apr. 10, 1989 and bearing Ser. No. 07/335,554.

Splice box 105 is attached to face plate 101 in a conventional manner. The splice box 105, essentially, contains the electrical connections to the light fixture 100. That is, the electrical wires or pigtails (not shown) which are connected to the electrical connector (e.g. and Edison-screw base) mounted in conventional fashion (but not shown) within the can 102. This electrical connector or screw-base is adapted to receive the connector portion (e.g., the threaded end) of the lamp (light source) 103.

In addition, the splice box 105 contains the connection to the external electrical wiring system and, thus, the power source. That is, a suitable connection wire 106, such as armored cable (e.g., BX cable), is connected to the electrical wires from the light fixture in splice box 105. The other end of cable 106 is connected to the electrical wiring system which is provided via junction box 107.

The foregoing description relates to a conventional can or recessed light fixture which is normally used with an incandescent or mecury vapor light source. In order to convert (or retrofit) to a high pressure sodium, fluorescent or metal halide light source, the existing fixture must be modified to include the proper ballast.

However, the typical ballast configuration would normally require a substantial reconfiguration and reconstruction of the existing wiring system. Also, the existing cans, junction boxes and the like in the overall system might have to be replaced.

Contrariwise, as shown in FIG. 1, a hardwire, add-on ballast 108 is used in this invention. The ballast 108 includes an outer housing (typically, but not limitatively, aluminum) which has the ballast structure (e.g. coils) capacitor, fuse or transformer) mounted therein and potted with epoxy, tar or other suitable material. The ballast 108 includes wires 109 (see FIG. 2) which extend through and from nipple 110 in one side of the ballast 108. The nipple 110 is adapted to pass through the opening (often referred to as a "knock-out") in the conventional junction box 107 or connection box. The nipple is threaded so as to be secured in position adjacent to the splice box 105 by means of a conventional nut 111 or the like which is used with conduit (or other electrical hardware). This is the usual, but not a limitative attachment process. Thus, standard ½" knockouts can be used in the top or sides of the existing splice box 105.

Concurrent reference is now made to FIG. 2. When the hardwire ballast 108 is properly affixed to the splice box 105 by means of the nipple 110 and the associated nut 111, the wires 109 from the ballast 108 are connected to the fixture 100. In particular, the wires 109 are connected to fixture wires 106 and to the electrical wiring system wires 106A. As shown in FIG. 2, wire nuts are used. However, other convenient connection techniques can be utilized, as desired. For example, attachment and mounting can also be made to and through knockout 105A with a suitable means for connection such as nipple, rivets, screws, or the like.

As seen in FIGS. 1 and 2, ballast 108 includes a plurality of fins 112 which extend outwardly from one surface thereof. The fins 112 serve to radiate heat away from the ballast 108 thereby to improve operation and extend the life thereof. Although fins 112 are desirable, they are not required in order for the unit to function properly.

During installation, access can be gained to the junction or splice box 105 by removing the reflector (in a plaster ceiling application) or by removing an adjacent ceiling tile (in a dropped ceiling application). The ballast 108 can be mounted to splice box 105, situ, without removing the fixture 100 or the related system wiring.

In the embodiment shown in FIG. 2, a second nipple 120 is depicted in another surface of the hardwire ballast 108. This second nipple (as well as additional nipples) can be used to mount light fixtures, such as spot lights, down lights, and the like directly thereto. Thus, the ballast 108 can be hardwired directly to an exposed junction box (similar to junction box 107). The spot light fixture can then be mounted directly onto the ballast nipple 120. Of course, the junction box 107 can be mounted on any suitable surface such as a wall or the like.

Referring now to FIG. 3, there is shown an exploded view of a light source 103, or the like. In this embodiment, a conventional high pressure sodium (HPS) lamp 201 is depicted. Other lamps of this type can be utilized. Moreover, suitable fluorescent lamps such as the Series 213 lamps can be utilized.

The screw-in adapter 202 is provided, as well. The adapter 202 is, typically, a threaded aluminum adapter with a nominal turning diameter to fit within the light fixture. The adapter 202 is designed to be of the appropriate length to permit the lamp unit 103 to fit within the light fixture 100, whether shallow or deep. The adapter 202 can be formed or molded of any suitable metal or plastic material and includes a conventional Edison-base 203 as a part thereof. The connections between the actual lamp socket (of lamp 201) and the base 203 are provided by means of a suitable socket. For single ended fluorescents, these sockets generally, have female pin receptacles which accept metal pins that are connected to one end of a single ended fluorescent light source.

Metal halide and high pressure sodium light sources (e.g., lamp 201) usually have an Edison screw base that can be screwed into the female Edison screw shell located within the screw base 203.

Other types of connectors, such as bayonet base, mini-cam or other suitable configurations are possible and can be used instead of the various threaded couplings.

The adapter 202 includes the main body or shell which supports and contains the connections. In addition, the threaded lip 205 is formed as part of the body or shell of adapter 202 by means of spinning, molding, or the like. Of course, attachment of the adapter can also be accomplished with screws, clips or the like.

The lamp fixture 103 also includes a reflector 280 (frequently referred to as a "glass"). Typically, the reflector 280 is fabricated of glass and has a mirrored, silvered or aluminized side portion 209. The front face 210 of the reflector 280 is not silvered so that light can escape therefrom. A threaded end 211 is joined to the neck 212 of the reflector 280 in a conventional manner.

It may be considered that the reflector 280 is, in fact, merely a standard reflector or glass portion fabricated for use with conventional incandescent lamps. For example, the reflector 280 shown in FIG. 3 is, basically, a PAR 38 glass which has been formed with the threaded end 211 attached thereto. Numerous other reflector (or glass) portions 280 can be used such as, but not limited to, R30, ER30, R40, ER40 or other decorative diffusers.

In operation, the lamp 201 (HSP, fluorescent, etc.) is engaged with the socket 204 by screwing or plugging in. The reflector 280 is then mounted to the adapter 202 by the respective threaded portions 211 and 205. The assembled lamp 103 is then inserted into the light fixture 100, ready for use (subsequent to the installation of the hardwire ballast 108).

Reference is now made to FIG. 4 which provides a schematic, end view representation of track for track lighting. In particular, the track 400 is standard track made and sold by Halo Lighting Co., Marco or others.

The track 400 includes an outer shell 401 with three (3) separate contact rails therein. The contact rails 402, 403 and 404 are, in operation, electrically energized. A standard Halo mount is inserted into and slid along the track. The mount makes electrical connection with the contact rails.

The track 450 includes a compatible 3-connector mount 451 which is inserted into and slidable along the Halo track 400. The track 452 permits mounting of HPS light sources or other simmilar track lights.

Referring now to FIG. 5, there is shown a disassembled lamp and lighting fixture 500. In this instance, a reflector 580 of conventional design is shown. This reflector is similar to reflector 208 shown in FIG. 3. A conventional lamp fixture 501 is incorporated, as well. In this embodiment, lamp 501 is representative of a fluorescent lamp and can be of the dual or quad types. The adapter 502 includes a socket 504 which receives the base of lamp 501. A suitable mounting lip 505 is adapted to receive and engage the mounting end of reflector 580. The adapter 502 includes a ballast therein.

A mounting spindle 525 is attached to the adapter 502 by any suitable means including a swivel coupler. A connector mounting 526 is attached to the spindle 525 in any suitable fashion. These parts may be made integrally or they may be joined together by threading or the like. A connector 527 is provided at the inner surface of mounting 526. The connector 527 is adapted to engage the track as shown in FIG. 4.

A glare shield 520 may be mounted around reflector 580 and attached to adapter 502 in a suitable fashion. Thus, the unit is assembled by placing lamp 501 into socket 504. The glare shield 520 is then mounted to the adapter 502. The reflector 580 is mounted over the lamp and engaged with the lip 505 of adapter 502. The connector 527 is then inserted into the track (see FIG. 4) and the lamp apparatus 500 is available for operation. Again, a non-incandescent lamp replaces an incandescent lamp and the attendant advantages are achieved.

Referring now to FIG. 6, another embodiment of the invention is disclosed. In this embodiment, a reflector 680, similar to reflector 280, is utilized along with an HPS lamp 601 (or 201). A cylindrical glare shield 620 is also used.

In this embodiment, the connector 627 and mount 626 are joined by the spindle 625 to a ballast 608 which is similar to the ballast 108 in FIGS. 1 and 2. In this case, the glare shield 620 is mounted to the ballast 608 by the nipple and nut arrangement as shown in FIGS. 1 and 2. Also, a suitable socket and adaptor are contained within the glare shield 620. Thus, the lamp 601 is inserted into the structure and enclosed within reflector 680 which is then screwed into place with the glare shield.

Thus, there has been shown and described a preferred embodiment of the instant invention. It is clear that those skilled in the art may conceive of modifications of this invention. For example, the adaptors may be long or short, depending upon the depth of the fixture. The lamp may be fluorescent, metal halide or high pressure sodium. The reflector (or globe) can take a number of configurations, as can the glare shield. The ballast can be mounted internally or externally relative to the building or structure involved. However, any such modifications which fall within the purview of this description are intended to be included therein as well. The description is intended to be illustrative only, not limitative. The scope of the invention is limited only by the claims appended hereto.

I claim:

1. A retrofit lighting fixture comprising,
a housing including a receptacle for receiving a light source,
a splice box joined to said housing,
connection means for making an electrical connection from an external power source to said receptacle in said housing via said splice box, and
ballast means selectively connected to said splice box in situ,
said ballast means is mechanically connected to and supported by said splice box,
said ballast means is electrically interconnected in series with said connection means.

2. The fixture recited in claim 1 wherein,
said connection means includes electrically conductive wire conductors.

3. The fixture recited in claim 1 wherein,
said light source comprises a fluorescent light bulb.

4. The fixture recited in claim 1 wherein,
said light source comprises an arc discharge light bulb.

5. The fixture recited in claim 1 wherein,
said light source comprises a high pressure sodium light bulb.

6. The fixture recited in claim 1 wherein,
said light source comprises a metal halide light bulb.

7. The fixture recited in claim 1 wherein,
said light source includes a mounting adapter for connection with said receptacle, and
a reflector which is adapted to be connected to said adapter.

8. The fixture recited in claim 1 wherein,
said ballast means is a self contained unit including a ballast housing, and
junction means for connecting said ballast housing to said splice box.

9. The fixture recited in claim 8 wherein,
said ballast housing includes radiation means for dissipating heat from said ballast means.

10. The fixture recited in claim 8 wherein,
said ballast housing is substantially cylindrical in configuration.

11. The fixture recited in claim 1 wherein,
said housing includes a reflector.

12. The fixture recited in claim 11 wherein,
said reflector substantially surrounds said receptacle to provide a reflector for said light source.

13. A light fixture including,
light source means,
receptacle means for receiving said light source means and establishing electrical contact therewith,
reflector means adapted to be mounted to said receptacle means and to substantially enclose said light source means,
ballast means mounted to and in electrical contact with said receptacle means,
mounting means connected to said ballast means for supporting said ballast means and providing a connection means for receiving electrical power for said ballast means and said light source means,
said mounting means is adapted to engage a track lighting system.

14. A retrofit lighting fixture comprising,
a housing for receiving a light source,
a splice box joined to said housing,
connection means for making an electrical connection in said housing via said splice box,
ballast means connected to said splice box in situ,
said light source includes a mounting adapter for connection with said housing, and
a reflector which is adapted to be connected to said adapter,
said reflector and said adapter include mating end portions for interconnection thereof.

15. A light fixture including,
light source means,
receptacle means for receiving said light source means and making electrical contact therewith,
reflector means adapted to substantially enclose said light source means and to be attached to said receptacle means,
ballast means mounted at and electrically connected to said receptacle means,
said ballast means is mounted at the exterior of said receptacle means,
connector means for supplying electrical power to said light source means via said ballast means and said receptacle means, and
glare shield means mounted at said receptacle means and substantially enclosing said reflector means.

16. The fixture recited in claim 15 wherein,
said reflector means is made of a mirrored glass element which surrounds said light source.

17. The fixture recited in claim 15 wherein,
said ballast means is a self-contained unit including a ballast housing, and
said ballast housing includes radiation means for dissipating heat from said ballast means.

18. The fixture recited in claim 15 wherein,
said connector means includes mounting means connected to said ballast means for supporting said ballast means and providing a connection means for receiving electrical power for said ballast means and said light source means.

* * * * *